United States Patent [19]

Stuart

[11] Patent Number: 5,317,877
[45] Date of Patent: Jun. 7, 1994

[54] INTERCOOLED TURBINE BLADE COOLING AIR FEED SYSTEM

[75] Inventor: Alan R. Stuart, Hamilton, Ohio

[73] Assignee: General Electric Company, Cincinnati, Ohio

[21] Appl. No.: 923,676

[22] Filed: Aug. 3, 1992

[51] Int. Cl.$^5$ ............................................. F02C 7/16
[52] U.S. Cl. ..................................... 60/736; 60/39.75
[58] Field of Search ...................... 60/39.07, 728, 736, 60/39.75; 415/115, 116

[56] References Cited

U.S. PATENT DOCUMENTS

| | | | |
|---|---|---|---|
| 2,891,382 | 6/1959 | Broffitt | 60/39.66 |
| 3,017,159 | 1/1962 | Foster et al. | 253/39.15 |
| 3,814,539 | 6/1974 | Klompas | 416/95 |
| 4,136,516 | 1/1979 | Corsmeier | 60/736 |
| 4,137,705 | 2/1979 | Andersen et al. | 60/39.08 |
| 4,187,675 | 2/1980 | Wakeman | 60/39.75 |
| 4,550,561 | 11/1985 | Coffinberry | 60/736 |
| 4,645,415 | 2/1987 | Hovan et al. | 415/115 |
| 4,882,902 | 11/1989 | Reigel et al. | 60/39.75 |
| 5,059,093 | 10/1991 | Khalid et al. | 60/39.07 |
| 5,163,385 | 11/1992 | Mazeaud et al. | 60/39.07 |

FOREIGN PATENT DOCUMENTS

| | | | |
|---|---|---|---|
| 120826 | 5/1988 | Japan | 60/736 |
| 112631 | 4/1990 | Japan | 60/736 |

OTHER PUBLICATIONS

Roth et al. *How to Use Fuel as a Heat Sink* Space & Aeronautics, Mar., 1960 pp. 56-60.

Primary Examiner—Louis J. Casaregola
Attorney, Agent, or Firm—Jerome C. Squillaro; John R. Rafter

[57] ABSTRACT

A gas turbine engine having a compressor and an air-cooled turbine is provided with a cooling system for decreasing the temperature of the turbine cooling air. A heat exchanger, mounted on the compressor casing, receives a portion of the pressurized air which is bled from the compressor. A heat sink medium is pumped through the heat exchanger into heat exchange relationship with the pressurized air, thereby cooling the air. The cooled air is then further pressurized and routed to and circulated through the turbine rotor blades to provide improved cooling thereof. The intercooling of the compressor bleed air permits a reduction in the quantity of compressor air required for turbine rotor blade cooling or allows an increase in turbine entry temperature and thus provides an improvement in engine power and performance. In the case where the heat sink medium is engine fuel, the heat extracted from the compressor bleed air is returned to the engine operating cycle in the form of heated engine fuel.

16 Claims, 3 Drawing Sheets

INTERCOOLED TURBINE BLADE COOLING AIR FEED SYSTEM

FIELD OF THE INVENTION

This invention relates to gas turbines and, more particularly, to a concept for efficiently reducing the temperature of air used to cool high-temperature turbine rotor blades.

BACKGROUND OF THE INVENTION

It is well understood that turbine inlet temperature is a major determinant of the specific power available from a gas turbine. However, current turbines are limited in inlet temperature by the physical properties of the materials used to construct the turbines. To permit turbines to operate at gas stream temperatures which are higher than the temperatures which conventional materials can normally tolerate, considerable effort has been devoted to the development of sophisticated methods of turbine cooling.

In early gas turbine engine designs, cooling of high-temperature components was limited to transferring heat to lower-temperature parts by the method of conduction, and air-cooling technology was limited to passing relatively cool air across the face of the turbine rotor disks. In order to take advantage of the potential performance improvements associated with higher turbine inlet temperatures, modern turbine cooling technology utilizes air-cooled hollow turbine nozzle vanes and rotor blades to permit operation at inlet gas temperatures in excess of 2000° F. Various techniques have been developed to cool these hollow blades and vanes. These incorporate two basic forms of air cooling, used either singly or in combination, depending upon the level of gas temperatures encountered and the degree of sophistication permissible. These basic forms of air cooling are known as convection and film cooling.

However, the benefits obtained from sophisticated air-cooling techniques are at least partially offset by the extraction of the necessary cooling air from the propulsive cycle. The conventional source of coolant for a high-pressure turbine is air which is bled off the compressor portion of the gas turbine engine and is routed to the hollow interior of the turbine blades. The quest for thermal efficiency has caused an increase in the compressor delivery air temperature. However, the compressor air, having a temperature much less than that of the turbine flow path gas stream, absorbs heat from the turbine blades to maintain the blades at an acceptable temperature. When this heated cooling air leaves the turbine blades, perhaps as a coolant film, this heat energy is lost to the propulsive cycle since the cooling air is normally mixed with the exhaust gases and ejected from an engine nozzle. More particularly, the air that is bled from the compressor and used as cooling air for the turbine rotor blades has had work done on it by the compressor. However, because it is normally reintroduced into the flow path gas stream downstream of the turbine nozzle, it does not return its full measure of work to the cycle as it expands through the turbine. Additionally, the reintroduction of cooling air into the gas stream produces a loss in gas stream total pressure. This is a result of the momentum mixing losses associated with injecting a relatively low-pressure cooling air into a high-pressure gas stream. The greater the amount of cooling air which is routed through the turbine blades, the greater the losses become in the propulsive cycle. Thus, while turbine blade cooling has inherent advantages, it also has associated therewith certain inherent disadvantages which are functions of the quantity of cooling air used in cooling the turbine rotor blades.

It will, therefore, be appreciated that engine performance can be increased by reducing the amount of cooling air required by the turbine rotor blades. One system for accomplishing this goal was disclosed in U.S. Pat. No. 4,137,705 to Andersen et al. In accordance with that teaching, an aircraft gas turbine engine is provided with a turbine wherein the rotor disk bears a plurality of hollow, air-cooled turbine blades. Cooling air is bled from the compressor portion of the engine and routed radially inwardly into a compact heat exchanger connected to and rotatable with the compressor. Heat which has been introduced into the cooling air through the compression process is extracted within the heat exchanger by engine lubricating oil which is routed through the heat exchanger and into heat exchange relationship with the cooling air. The cooled cooling air is then directed from the heat exchanger and through the turbine rotor blades to provide improved cooling thereof. The lubricating oil is that which performs the usual engine lubrication function so that an additional coolant need not be carried by the aircraft. Subsequently, this oil is cooled by engine fuel or the fan bypass stream airflow (in a gas turbofan engine) in a stationary heat exchanger relatively remote from the turbine. The use of the fuel as the final heat sink results in a partially regenerative engine in that most of the heat removed from the compressed air is reintroduced into the engine cycle as heated engine fuel.

SUMMARY OF THE INVENTION

It is an object of the present invention to improve upon the teaching of U.S. Pat. No. 4,137,705 by eliminating the lubricating oil from the heat exchange cycle and performing the coolant heat exchange or heat rejection external to the engine, thus providing scope for efficient heat exchanger design, including modulation of coolant temperature and easy access for inspection and replacement. In particular, it is an object of the invention to provide direct or indirect heat exchange between cooling air bled from the high-pressure compressor and the fuel for the engine.

Another object of the invention is to enhance the efficiency and increase the power available from a core engine of predetermined size.

A further object of the invention is to provide an aircraft gas turbine engine in which the turbine rotor blades are cooled to withstand the high-temperature gases of combustion.

It is another object of the invention to reduce the amount of cooling air required by the turbine rotor blades by reducing the temperature of the cooling air passing therethrough in order to improve cooling effectiveness.

Yet another object is to provide an aircraft gas turbine engine wherein the work done by the compressor on that portion of the pressurized air used for turbine cooling is returned to the engine power cycle as useful energy.

Another object of the invention is to provide a mechanism for modulating the coolant temperature at lower power and lower fuel flows. In particular, to avoid overheating of the fuel at low fuel flows, the cooling air bled from the compressor should bypass the fuel heat exchanger.

These objects are attained in an aircraft gas turbine engine in accordance with the invention by providing a turbine wherein the rotor disk bears a plurality of hollow, air-cooled turbine blades. Cooling air is bled from the high-pressure compressor and routed into a heat exchanger mounted at a location remote from the turbine, for example, on the outside of the compressor casing. Heat which has been introduced into the cooling air through the compression process is extracted within the heat exchanger by fuel which acts as a heat sink when routed through the heat exchanger and brought into heat exchange relationship with the cooling air, either directly or by way of an intermediate inert or nonflammable fluid medium. The use of inert or nonflammable fluid as the intermediate medium eliminates the possibility of fuel entering the cooling air flow path, which could result in the event of a leak in a heat exchanger where the fuel and cooling air are in direct heat exchange relationship.

The cooled cooling air is then directed from the heat exchanger, further compressed and then passed through the turbine rotor blades to provide improved cooling thereof. For higher coolant flows, fan bypass air can be used as a supplemental or alternative heat sink. The use of fuel as the heat sink results in a partially regenerative engine in which the heat removed from the compressed air is reintroduced more efficiently into the engine cycle.

Incorporation of the turbine blade cooling system in accordance with the invention into an aircraft or other gas turbine engine permits a reduction in the quantity of compressor air required for turbine rotor blade cooling and thus provides an improvement in engine performance. Conversely, an increase in blade life can be achieved by maintaining the original coolant flow rate but reducing the temperature of the coolant, with essentially no degradation in engine performance, or the turbine entry temperature can be increased to raise power output.

BRIEF DESCRIPTION OF THE DRAWINGS

These and other advantages of the invention will be better understood when the detailed description of the preferred embodiment of the invention is read in conjunction with the drawings, wherein.

DETAILED DESCRIPTION OF THE PREFERRED EMBODIMENTS

Figure 1:
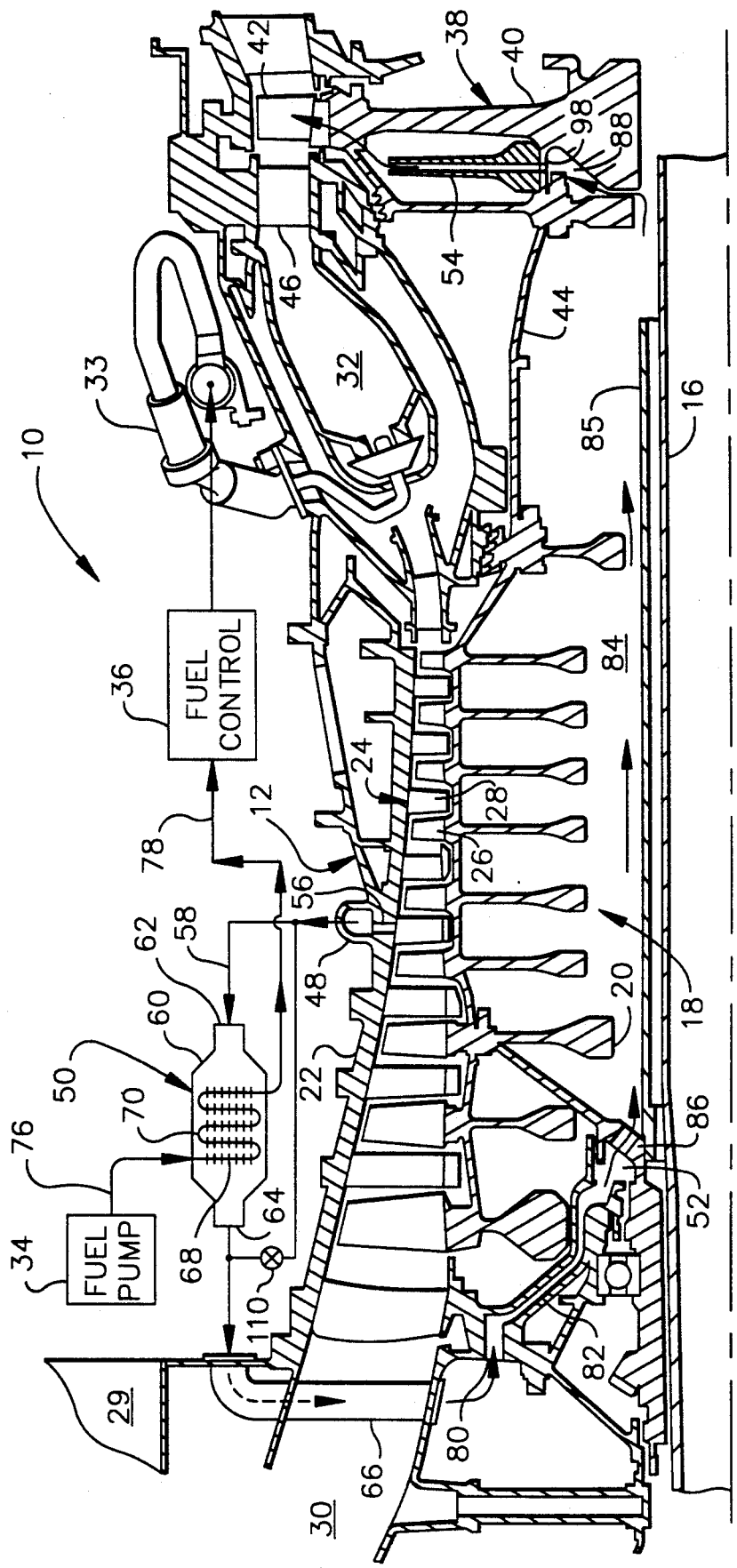
FIG. 1 is a partial cross-sectional view of an aircraft gas turbine turbofan engine in accordance with a first preferred embodiment of the invention and illustrating schematically the relationship of various systems.

In FIG. an aircraft gas turbofan engine incorporating the invention is generally indicated by the numeral 10. This engine generally comprises a core engine 12, a fan assembly (not shown) including a stage of fan blades (not shown), and a fan turbine (not shown) which is interconnected to the fan assembly by rotatable shaft 16. The core engine 12 includes an axial-flow high-pressure compressor 18 having a rotor 20 and a compressor casing 22 bearing a plurality of stators 24 interposed in alternating relationship with the stages of rotor 20. Each stage of rotor 20 bears a plurality of radially directed, circumferentially distributed rotor blades 26 and each stator 24 bears a plurality of radially directed, circumferentially distributed stator guide vanes 28.

Air enters the inlet (not shown) of and is initially compressed by the fan assembly. A first portion of this compressed air enters the fan bypass duct defined, in part, by core engine 12 and a circumscribing fan nacelle (not shown) and discharges through a fan duct 29 (only a portion of which is shown) and a fan nozzle (not shown). A second portion of the compressed air may be further compressed by a booster or other compressor and then enters inlet 30, is further compressed by the axial-flow compressor 18 and then is discharged to a combustor 32. In the combustor 32 the air is mixed with fuel. The fuel is supplied to fuel manifold 33 by means such as a fuel pump 34 and an engine fuel control 36 of a type well known in the art and responsive to pilot throttle inputs. The mixture is burned to provide high-energy combustion gases which drive a core engine turbine rotor 38.

Core engine high-pressure turbine rotor 38 comprises a turbine disk 40 bearing a plurality of hollow turbine rotor blades 42 about its periphery. The turbine rotor 38 drives, in turn, the compressor rotor 20 through interconnecting shaft 44 in the usual manner of a gas turbine engine. A stationary row of turbine nozzle vanes 46 orients the flow into the rotating turbine rotor blades 42.

The hot combustion gases then pass through and drive the fan turbine, which in turn drives the fan assembly. A propulsive force is thus obtained by the action of the fan assembly discharging air from the fan bypass duct through the fan nozzle and by the discharge of combustion gases from a core engine nozzle (not shown), the structure of which is well known in the art.

In accordance with a first preferred embodiment of the present invention, a turbine cooling system is provided which bleeds air from the high-pressure compressor 18, transfers heat from that compressor bleed air to the fuel to be fed to the combustor 32, and then supplies the cooled compressor bleed air to the cooling circuits (not shown) of the rotor blades 42 of the high-pressure turbine rotor 38. The turbine cooling system generally includes an annular outlet manifold 48 for bleeding air from the high-pressure compressor 18, a heat exchanger 50 for transferring heat by conduction from the compressor bleed air to the fuel being fed to the combustor 32, an annular inlet manifold 52 for circumferentially distributing the cooled compressor bleed air returned to the core engine from the heat exchanger, and an impeller 54 for further compressing and feeding the cooling air to the hollow turbine rotor blades 42.

In accordance with the invention, the compressor bleed air is extracted through a plurality of openings 56 which communicate with outlet manifold 48. For the purpose of illustration only, FIG. shows the pressurized air being extracted behind the fourth-stage rotor, although the air may in the alternative be extracted further downstream or further upstream. The precise point of extraction will be a function of the amount of pressurization required in any particular gas turbine engine in conjunction with impeller 54 to force the cooling air through blades 42.

The high-pressure bleed air flows from outlet manifold 48 to heat exchanger 50 by way of outlet conduit 58. Heat exchanger 50 comprises a casing 60 with an inlet 62 for receiving pressurized bleed air from outlet conduit 58 and an outlet 64 for outputting cooled bleed air to an inlet conduit 66 for return to the core engine. A plurality of straight extruded tubes 68 are arranged inside casing 60 in a generally parallel array, the ends of straight tubes 68 being connected by a plurality of U-shaped tubes 70 to form a serpentine heat exchange circuit.

Figure 2:
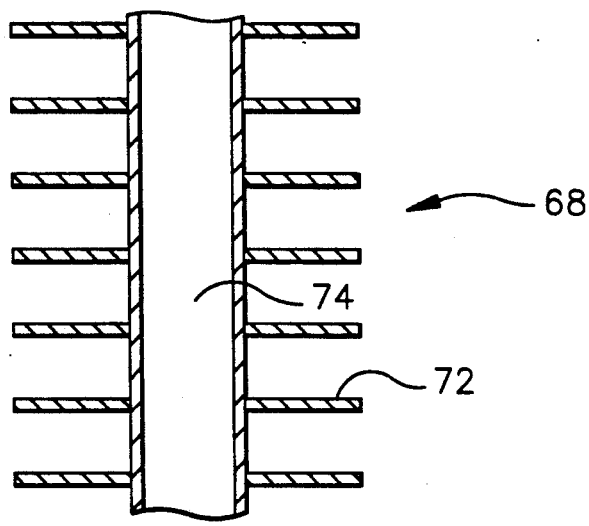
FIG. 2 is an enlarged, fragmentary, cross-sectional view depicting the internal construction of the pin or fin heat exchanger in accordance with the invention.

The internal structure of straight tube 68 is shown in detail in FIG. 2. Each straight tube 68 has associated therewith a plurality of laterally extending pins or fins 72 distributed at equal intervals along its length. The fins are generally parallel, the parallel surfaces defining the direction of the compressor bleed air flowing therebetween from inlet 62 to outlet 64 of the heat exchanger. Each pinned or finned tube 68 has an axially extending hole 74 extending through the interior thereof via which the fuel from fuel pump 34 flows on its way to fuel control 36.

In accordance with the first preferred embodiment of the invention, the inlet of the serpentine heat exchange circuit is connected to fuel tank 34 via fuel line 76; the outlet of the serpentine heat exchange circuit is connected to fuel control 36 via fuel line 78. The inlet and outlet of the serpentine heat exchange circuit are arranged so that the fuel is in counterflow relationship with the compressor bleed air.

By way of example, the compressor bleed air taken from the fourth stage of the high-pressure compressor has a temperature of about 700° F. and a pressure of about 150 psi. Inside the heat exchanger, that temperature is reduced by the conduction of heat from the compressor bleed air to the external surface of the finned tubes 68, further conduction of heat from the external surface to the internal surface of finned tubes 68, and consequent conduction of heat from the internal surface of finned tubes 68 to the fuel. As a result of this heat exchange, the temperature of the bleed air can be reduced by up to 400° F., i.e., to a temperature of 300° F., while the temperature of the fuel is raised by 150° F. As a result, the heat removed from the compressor bleed air is recovered and returned to the engine propulsive cycle, thus improving overall engine performance.

Figure 3:
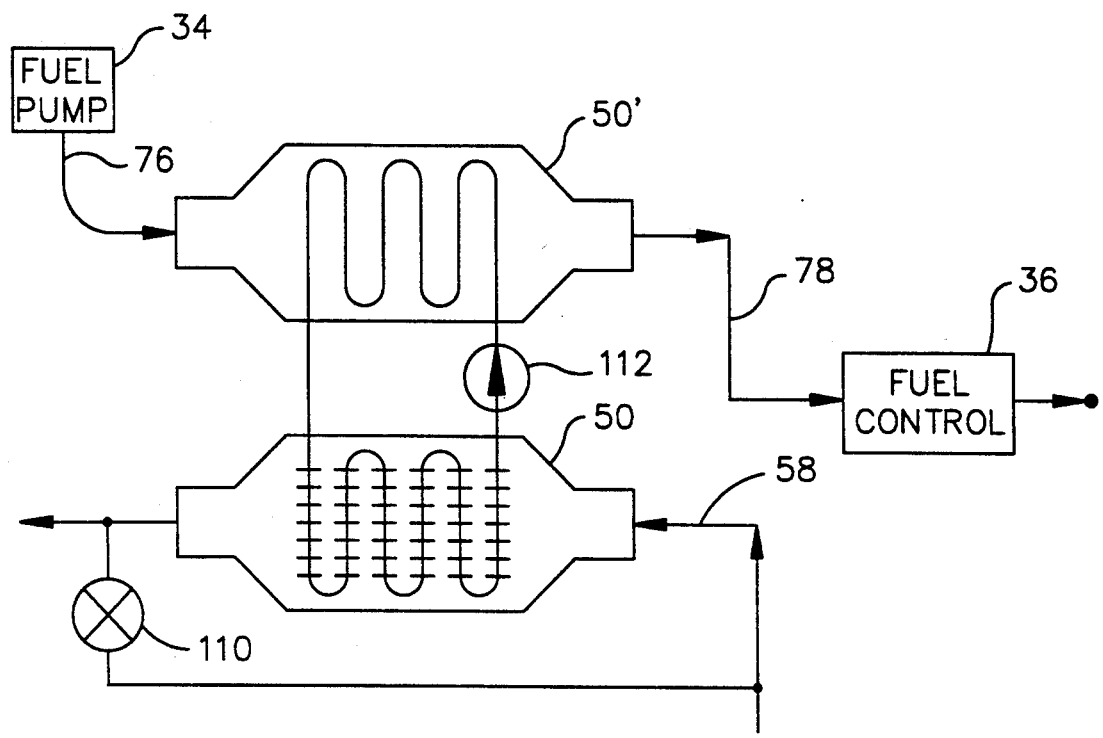
FIG. 3 is a block diagram illustrating schematically the relationship of various systems in accordance with a second preferred embodiment of the invention.

In accordance with a second preferred embodiment of the invention, an inert or nonflammable fluid medium, e.g., water or an antifreeze mixture such as water and glycol, is placed in intermediate heat exchange relationship for facilitating heat transfer from the compressor bleed air to the fuel. This preferred embodiment requires two heat exchangers: the first for the transfer of heat from the compressor bleed air to the intermediate inert or nonflammable fluid and the second for the transfer of heat from the intermediate inert or nonflammable fluid to the fuel. The inert or nonflammable fluid would be pumped by pump 112 through a closed circuit which includes the serpentine heat exchange circuits of both heat exchangers 50 and 50', as depicted in FIG. 3. The advantage of this construction is that in the event of fuel leakage into the second heat exchanger, the fuel leakage will not enter the core engine with the cooling air, which would create a fire hazard.

In accordance with a third preferred embodiment of the invention, fan bypass air is used as a secondary or alternative heat sink. Although the use of fan bypass air as a heat sink provides minimal regenerative benefit, it enables the compressor bleed air to be cooled, with consequent reduction in the metal temperature of the turbine rotor blades, in cases where the fuel cannot serve as a heat sink for the compressor bleed air.

A common feature of all preferred embodiments of the invention is that the cooled bleed air exits the heat exchanger and is piped via inlet conduit 66 to an inlet 80 which communicates with annular inlet manifold 52 by means such as a duct 82. The inlet manifold 52 circumferentially distributes the cooling air. From inlet manifold 52, the cooling air is then pumped into an annular cavity 84 between the compressor 18 and tube 85 by way of holes through stub shaft 86 in a well-known manner.

In the regenerative preferred embodiments, the 300° F. cooling air then flows aftward until it reaches an annular chamber 88 located inside the bore 92 of radial outflow impeller 54 and in front of (or to the rear of) turbine disk 40. The pressure inside chamber 88 is about 135 psi.

Figure 4:
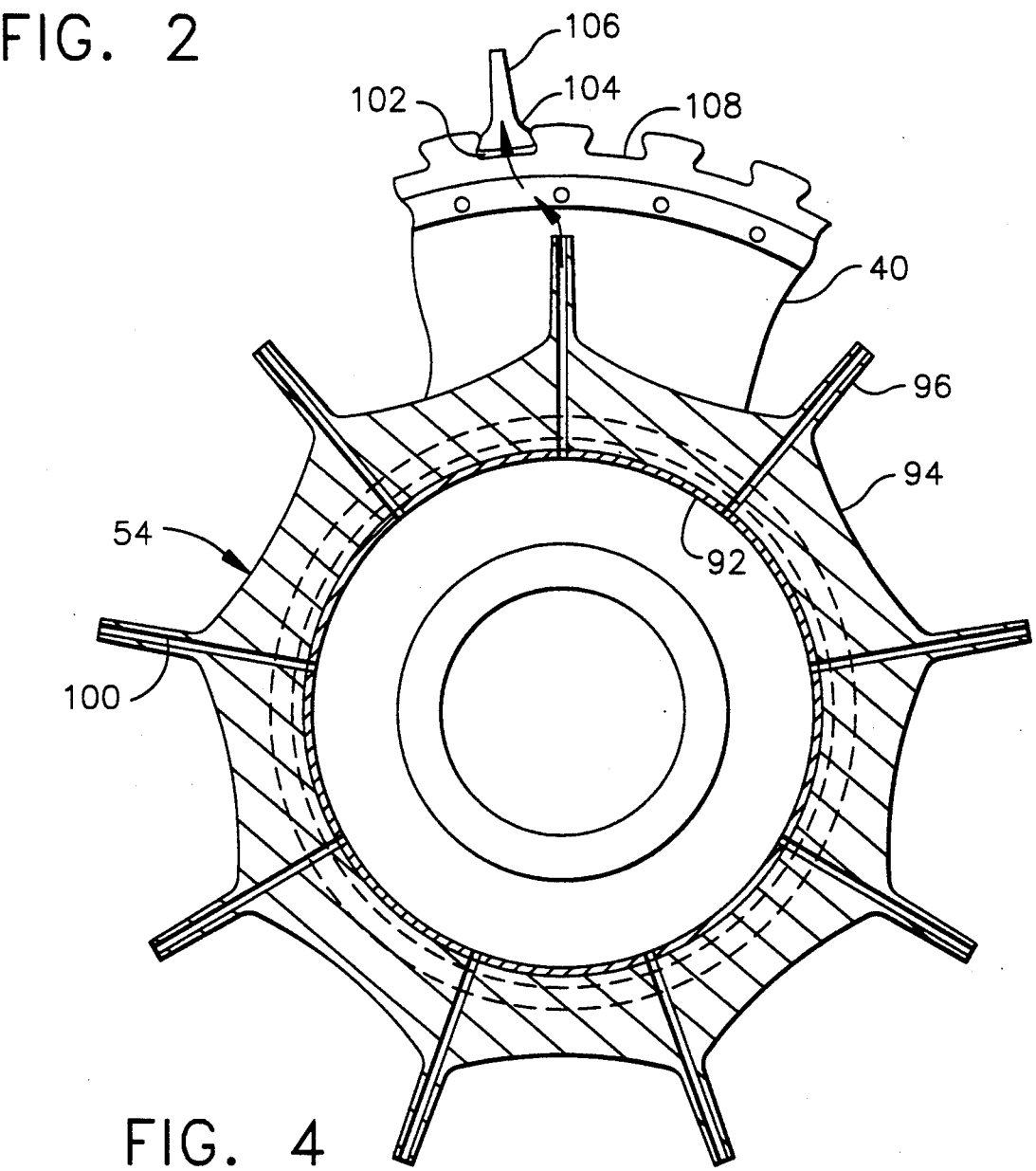
FIG. 4 is a front view of the coolant impeller and turbine disk in accordance with the preferred embodiments of the invention.
Figure 5:
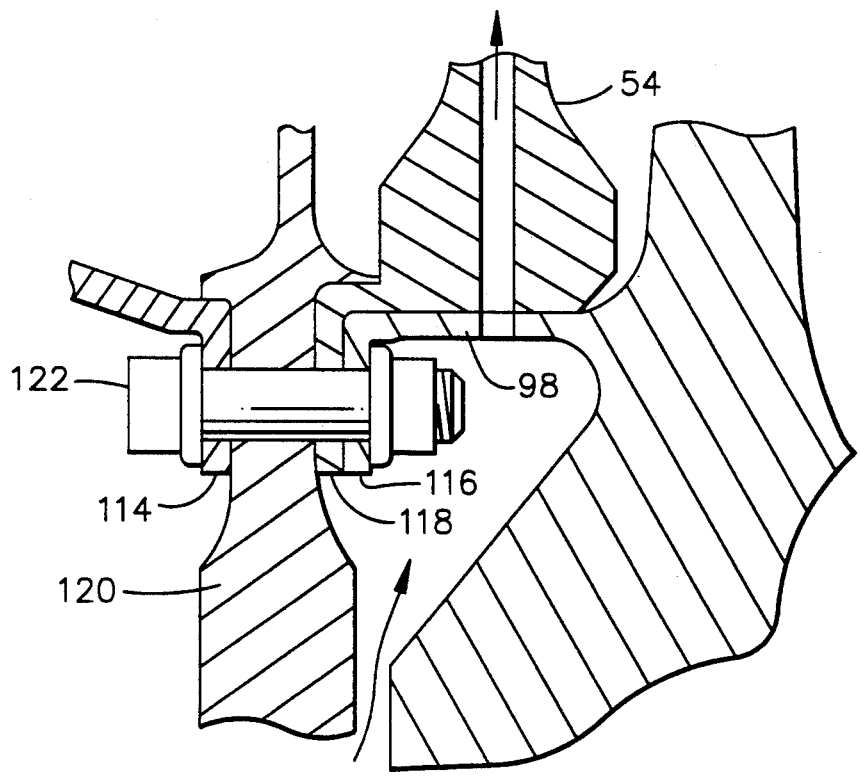
FIG. 5 is a sectional view depicting the manner in which the coolant impeller of FIG. 4 is mounted.

As best seen in FIG. 4, impeller 54 comprises a generally annular disk 94 having a plurality of hollow radial spokes 96 circumferentially distributed on its periphery. Impeller 54 is seated on an arm 98 which extends from the high-pressure turbine disk 40. As best seen in FIG. 5, flange 114 of shaft 44, flange 116 of arm 98 and flange 118 of impeller 54 are secured to disk 120 by bolt 122.

During rotation of impeller 54, the cooling air in chamber 88 is centrifuged via radial holes 100, each of which extends from the bore 92 to the tip of a corresponding spoke 96. Depending on conditions, impeller 54 will have a pressure ratio of 2 or more. For example, impeller 54 compresses the cooling air to a pressure of about 280 psi and a temperature of about 476° F. The compressed cooling air from impeller 54 then enters the spaces 102 formed between the roots 104 of the rotor blades 106 and the corresponding dovetail slots 108 formed in the turbine disk 40.

Each rotor blade has a cooling circuit (not shown) of conventional design incorporated therein, which cooling circuit communicates with the corresponding space 102 via one or more inlets formed in the root portion thereof. The rotor blade is then convection and film cooled by the cooling air which flows through the cooling circuit in a well-known manner.

The result of the intercooled cooling air system in accordance with the invention is a considerable reduction in the coolant flow and the coolant parasitic power consumption, as compared to a conventional high-pressure turbine blade cooling air feed system.

In the regenerative preferred embodiments, the heat extracted from the compressor bleed air is not lost to the cycle, but rather is added to the combustion process via the fuel. This adds to the fuel energy input. Thus, an improvement in efficiency and power output can be expected.

The greatest benefit of the invention derives not so much from the reduced coolant airflows, but rather from the ability to considerably raise the turbine entry temperature, while reducing the metal temperature of the high-pressure turbine rotor blades.

In accordance with a further feature of the invention shown in FIG. 1, at low power states and fuel flow rates below a predetermined threshold, e.g., during cruise and idle, a bypass valve 110 can be operated to enable the coolant to bypass the heat exchanger, thereby modulating the coolant temperature. This bypass feature avoids overheating of the fuel which is passing through the heat exchanger at a relatively low rate reflecting the low power state of the engine, which overheating could create fuel system problems.

The preferred embodiment has been described in detail hereinabove for the purpose of illustration only. Various modifications could be made to the above-described structure without departing from the spirit and scope of the invention as defined in the claims set forth hereinafter. For example, while the present invention has been depicted as integral part of a gas turbo-fan engine, it will be apparent to those skilled in the art of gas turbine engines that the present invention is equally applicable to engines of the gas turbojet variety, gas turbofan engines having three or more spools, or marine and industrial gas turbines. For marine and industrial engines, it is possible to use water and atmospheric air, respectively, as a secondary or alternative heat sink.

I claim:

1. A gas turbine engine comprising a compressor for compressing air and having a rotor, a turbine having a rotor with a plurality of air-cooled rotor blades, a casing which encases said compressor, a first heat exchanger mounted outside said casing and having a chamber with an inlet and an outlet, means for bleeding air from an intermediate stage of said compressor, means for supplying said compressor bleed air to said chamber inlet of said first heat exchanger, and means for circumferentially distributing said compressor bleed air from said chamber outlet of said first heat exchanger to an annular cavity surrounding a shaft by which said turbine rotor drives said compressor rotor and means for impelling said cooled compressor bleed air radially outward, further increasing its pressure, through a plurality of hollow radial spokes to said air-cooled rotor blades, said first heat exchanger further having an inlet for receiving a first fluid inert medium and having a temperature lower than the temperature of said bleed air and a heat exchange circuit communicating with said fluid medium inlet for conducting heat from said bleed air to said first fluid medium, whereby said first fluid medium is heated and said compressor bleed air is cooled.

2. The gas turbine engine as defined in claim 1, wherein said first fluid medium is water.

3. The gas turbine engine as defined in claim 1, wherein said first fluid medium is air.

4. The gas turbine engine as defined in claim 1, wherein said first heat exchanger places said first fluid medium and said compressor bleed air in counterflow heat exchange relationship.

5. The gas turbine engine as defined in claim 1, wherein said means for supplying said compressor bleed air to said chamber inlet of said first heat exchanger comprises an annular manifold in fluid communication with said compressor via a plurality of outlets formed in said casing.

6. The gas turbine engine as defined, in claim 1, further comprising a second heat exchanger mounted outside said engine casing and having a chamber with an inlet and an outlet, and means for supplying a second fluid medium to said chamber inlet of said second heat exchanger, wherein said second fluid medium has a temperature lower than the temperature of said first fluid medium and said second heat exchanger further has a heat exchange circuit which is in fluid communication with said heat exchange circuit of said first heat exchanger, thereby forming a closed circuit which carries said first fluid medium, whereby said second fluid medium is heated in said second heat exchanger by conduction of heat from said first fluid medium.

7. The gas turbine engine as defined in claim 6, further comprising a combustor and means for transporting said second fluid medium from said chamber outlet of said second heat exchanger to said combustor, said first fluid medium being inert and said second fluid medium being fuel.

8. A system for feeding cooling air to the rotor blades of a turbine in a gas turbine engine having a compressor for compressing air and a combustor for burning a mixture of pressurized air and fuel, comprising:
means for bleeding air from an intermediate stage of said compressor;
a first heat exchanger having a chamber with an inlet and an outlet;
means for supplying said compressor bleed air from an intermediate stage of compressor to said chamber inlet of said first heat exchanger;
means for circumferentially distributing said compressor bleed air from said chamber outlet of said first head exchanger to an annular cavity surrounding a shaft by which said turbine rotor drives said compressor rotor; and
means for impelling said cooled compressor bleed air radially outward, further increasing its pressure, through a plurality of hollow radial spokes to said rotor blades,
wherein said first heat exchanger further has an inlet for receiving an inert fluid medium having a temperature lower than the temperature of said bleed air and a heat exchange circuit communicating with said fluid medium inlet for conducting heat from said bleed air to said inert fluid medium, whereby said inert fluid medium is heated and said compressor bleed air is cooled.

9. The cooling air feed system as defined in claim 8, wherein said first heat exchanger places said inert fluid medium and said compressor bleed air in counterflow heat exchange relationship.

10. The cooling air feed system as defined in claim 8, wherein said means for supplying said compressor bleed air to said chamber inlet of said first heat exchanger comprises an annular manifold in fluid communication with said compressor.

11. The cooling air feed system as defined in claim 8, further comprising a second heat exchanger having a chamber with an inlet and an outlet, means for supplying fuel to said chamber inlet of said second heat exchanger, and means for transporting said fuel from said chamber outlet of said second heat exchanger to said combustor, wherein said fuel has a temperature lower than the temperature of said inert fluid medium and said second heat exchanger further has a heat exchange circuit in fluid communication with said heat exchange circuit of said first heat exchanger, thereby forming a closed circuit which carries said inert fluid medium, whereby said fuel is heated before being transported to said combustor by conduction of heat from said inert fluid medium.

12. The cooling air feed system as defined in claim 8, wherein said fluid medium is water.

13. The cooling air feed system as defined in claim 8, wherein said fluid medium is antifreeze.

14. A system for feeding cooling air to the rotor blades of a turbine in a gas turbine engine having a compressor for compressing air and a combustor for burning a mixture of pressurized air and fuel, comprising:
- means for bleeding air from an intermediate stage of said compressor;
- heat exchange means for transferring heat by conduction from a first fluid communication circuit to a second fluid communication circuit;
- means for supplying said compressor bleed air from an intermediate stage of said compressor to said first fluid communication circuit of said heat exchange means;
- means for supplying fuel having a temperature less than the temperature of said compressor bleed air to said second fluid communication circuit of said heat exchange means;
- means for circumferentially distributing said compressor bleed air from said first fluid communication circuit of said heat exchange means to an annular cavity surrounding a shaft by which said turbine rotor drives said compressor rotor; and
- means for impelling said cooled compressor bleed air radially outward, further increasing its pressure, through a plurality of hollow radial spokes to said rotor blades;
- whereby said fuel is heated before being supplied to said combustor and said compressor bleed air is cooled and recompressed before being circumferentially distributed to said rotor blades.

15. The cooling air feed system as defined in claim 14, wherein said heat exchange means comprises a closed circuit containing an inert or nonflammable fluid medium, said closed circuit having a first portion in heat exchange relationship with said compressor bleed air in said first fluid communication circuit and a second portion in heat exchange relationship with said fuel in said second fluid communication circuit.

16. The cooling air feed system as defined in claim 14, further comprising means for enabling said compressor bleed air to bypass said heat exchange means when the flow rate or temperature of said fuel reaches a predetermined threshold.

* * * * *